United States Patent
Santos Zubiaur et al.

(10) Patent No.: US 11,912,185 B1
(45) Date of Patent: Feb. 27, 2024

(54) VEHICLE WITH MOVABLE AUXILIARY PANEL

(71) Applicant: Ford Global Technologies, LLC, Dearborn, MI (US)

(72) Inventors: Pablo Francisco Santos Zubiaur, Azcapotzalco (MX); Carlos Ricardo Rios Guadarrama, Ciudad Lopez Mateos (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/940,345

(22) Filed: Sep. 8, 2022

(51) Int. Cl.
*B60R 5/04* (2006.01)
*B60N 3/00* (2006.01)

(52) U.S. Cl.
CPC ............. *B60N 3/001* (2013.01); *B60R 5/045* (2013.01)

(58) Field of Classification Search
CPC .................................................. B60R 5/045
USPC ................... 296/37.1, 57.1, 146.8
See application file for complete search history.

(56) References Cited

U.S. PATENT DOCUMENTS

| | | | |
|---|---|---|---|
| 4,664,437 A | | 5/1987 | Queveau |
| 5,372,289 A | * | 12/1994 | Dachicourt ............... B60R 7/02 224/538 |
| 6,641,190 B2 | * | 11/2003 | Kirchhoff ................. B60P 3/14 296/26.11 |
| 9,637,058 B1 | * | 5/2017 | Garcia Zarco ......... B60N 3/002 |
| 10,286,848 B2 | | 5/2019 | Herman et al. |
| 11,142,129 B2 | | 10/2021 | Howard, II et al. |
| 11,535,162 B1 | * | 12/2022 | Nasca ................... B60R 13/013 |
| 2022/0009419 A1 | | 1/2022 | Kim et al. |

FOREIGN PATENT DOCUMENTS

| DE | 19813751 A1 * | 9/1999 | ............. B60R 5/045 |
|---|---|---|---|
| KR | 101591415 B1 | 2/2016 | |

* cited by examiner

*Primary Examiner* — Joseph D. Pape
(74) *Attorney, Agent, or Firm* — Vichit Chea; Price Heneveld LLP (57) ABSTRACT

A vehicle includes a body, an access aperture that is defined by the body, a closure panel, and an auxiliary panel. The closure panel is movably coupled to the body. The closure panel is movable between an open position and a closed position such that the closure panel selectively covers the access aperture. The auxiliary panel is removably coupled to the closure panel. The auxiliary panel is movable between an engaged state and a disengaged state relative to the closure panel. The auxiliary panel travels with the closure panel when the auxiliary panel is in the engaged state. The disengaged state of the auxiliary panel corresponds with a use position of the auxiliary panel.

18 Claims, 7 Drawing Sheets

VEHICLE WITH MOVABLE AUXILIARY PANEL

FIELD OF THE DISCLOSURE

The present disclosure generally relates to a vehicle. More specifically, the present disclosure relates to a vehicle with a movable auxiliary panel.

BACKGROUND OF THE DISCLOSURE

Consumers often compare available features and functionality between vehicles when making a purchasing decision. Accordingly, additional solutions are needed that provide features and functionality that are desirable to consumers.

SUMMARY OF THE DISCLOSURE

According to a first aspect of the present disclosure, a vehicle includes a body, an access aperture that is defined by the body, a closure panel, and an auxiliary panel. The closure panel is movably coupled to the body. The closure panel is movable between an open position and a closed position such that the closure panel selectively covers the access aperture. The auxiliary panel is removably coupled to the closure panel. The auxiliary panel is movable between an engaged state and a disengaged state relative to the closure panel. The auxiliary panel travels with the closure panel when the auxiliary panel is in the engaged state. The disengaged state of the auxiliary panel corresponds with a use position of the auxiliary panel.

Embodiments of the first aspect of the disclosure can include any one or a combination of the following features:
- the auxiliary panel is free of direct coupling with the closure panel when the auxiliary panel is in the disengaged state;
- the auxiliary panel is a work surface;
- the closure panel is a hood of the vehicle;
- the access aperture permits access to a cargo area;
- at least a portion of the cargo area remains accessible when the auxiliary panel is in the disengaged state and the closure panel is in the open position;
- a controller that issues a first user notification in response to a first instance of a first user input when the auxiliary panel is in the engaged state;
- the controller places the closure panel in the open position in response to a second instance of the first user input;
- the controller transitions the auxiliary panel to the disengaged state in response to a first instance of a second user input that follows the first user notification within a predetermined timeframe;
- the controller issues a second user notification when the first instance of the second user input is received within the predetermined timeframe;
- the second user notification indicates that the auxiliary panel has been transitioned to the disengaged state;
- the controller issues a second user notification in response to the first instance of the first user input when the auxiliary panel is in the disengaged state;
- the controller places the closure panel in the open position in response to a second instance of the first user input;
- the controller transitions the auxiliary panel to the engaged state in response to a first instance of a second user input that follows the first user notification within a predetermined timeframe;
- the controller issues the first user notification when the first instance of the second user input is received within the predetermined timeframe; and
- the first user notification indicates that the auxiliary panel has been transitioned to the engaged state.

According to a second aspect of the present disclosure, a vehicle includes a body, an access aperture defined by the body, a closure panel, and an auxiliary panel. The access aperture permits access to a cargo area. The closure panel is movably coupled to the body. The closure panel is movable between an open position and a closed position such that the closure panel selectively covers the access aperture. The auxiliary panel is removably coupled to the closure panel. The auxiliary panel is a work surface. The auxiliary panel is movable between an engaged state and a disengaged state relative to the closure panel. The auxiliary panel travels with the closure panel when the auxiliary panel is in the engaged state. The disengaged state of the auxiliary panel corresponds with a use position of the auxiliary panel. The auxiliary panel is free of direct coupling with the closure panel when the auxiliary panel is in the disengaged state. At least a portion of the cargo area remains accessible when the auxiliary panel is in the disengaged state and the closure panel is in the open position.

Embodiments of the second aspect of the present disclosure can include any one or a combination of the following features:
- the closure panel is a hood of the vehicle;
- a controller issues a first user notification in response to a first instance of a first user input when the auxiliary panel is in the engaged state, wherein the controller places the closure panel in the open position in response to a second instance of the first user input when the auxiliary panel is in the engaged state, wherein the controller transitions the auxiliary panel to the disengaged state in response to a first instance of a second user input that follows the first user notification within a predetermined timeframe when the auxiliary panel is in the engaged state, wherein the controller issues a second user notification when the first instance of the second user input is received within the predetermined timeframe; and
- the controller issues a second user notification in response to the first instance of the first user input when the auxiliary panel is in the disengaged state, wherein the controller places the closure panel in the open position in response to a second instance of the first user input when the auxiliary panel is in the disengaged state, wherein the controller transitions the auxiliary panel to the engaged state in response to a first instance of a second user input that follows the first user notification within a predetermined timeframe when the auxiliary panel is in the disengaged state, wherein the controller issues the first user notification when the first instance of the second user input is received within the predetermined timeframe, wherein the first user notification indicates that the auxiliary panel has been transitioned to the engaged state.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
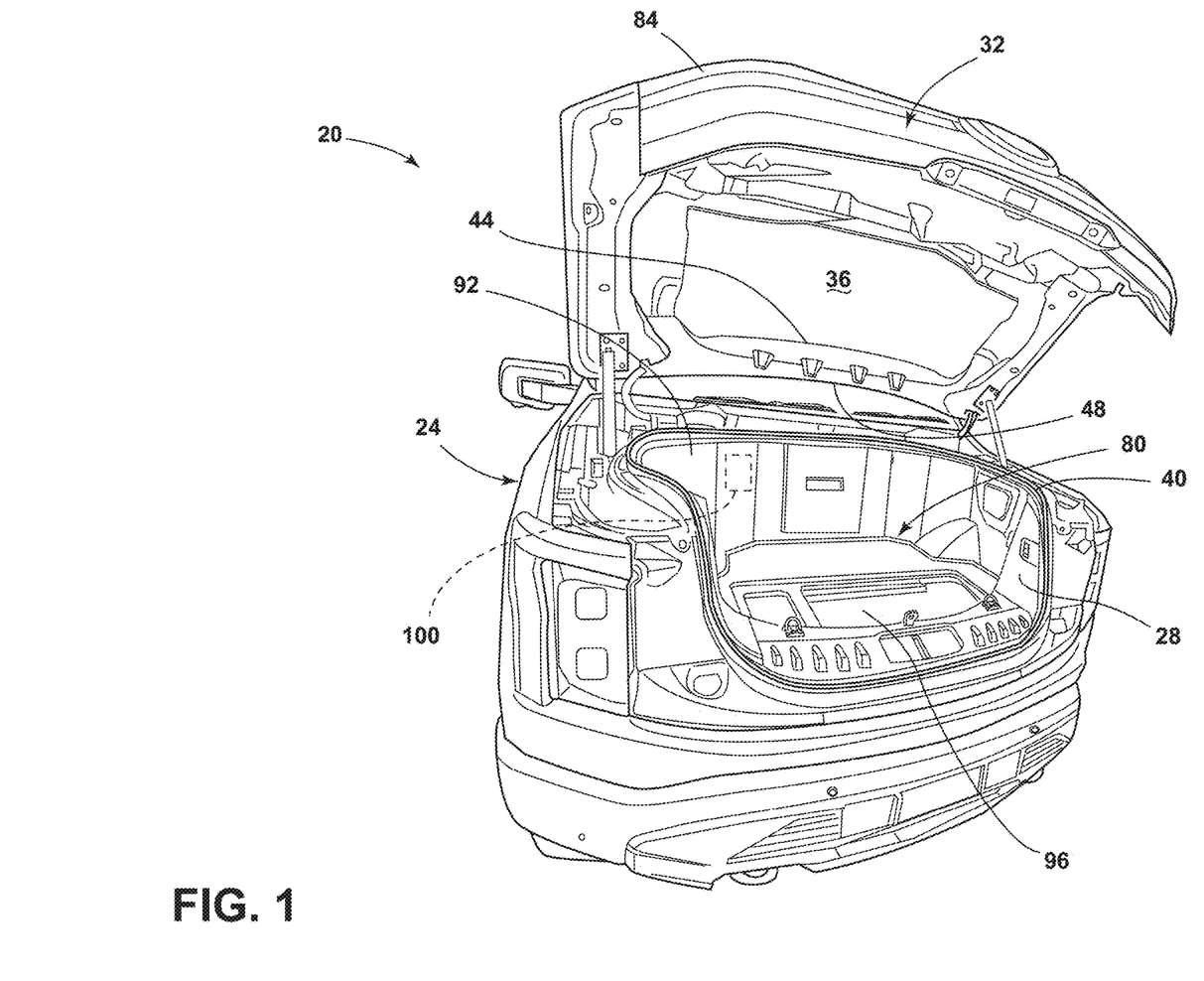
FIG. 1 is a front perspective view of a vehicle, illustrating a closure panel in an open position and an auxiliary panel in an engaged state, according to one example.
Figure 2:
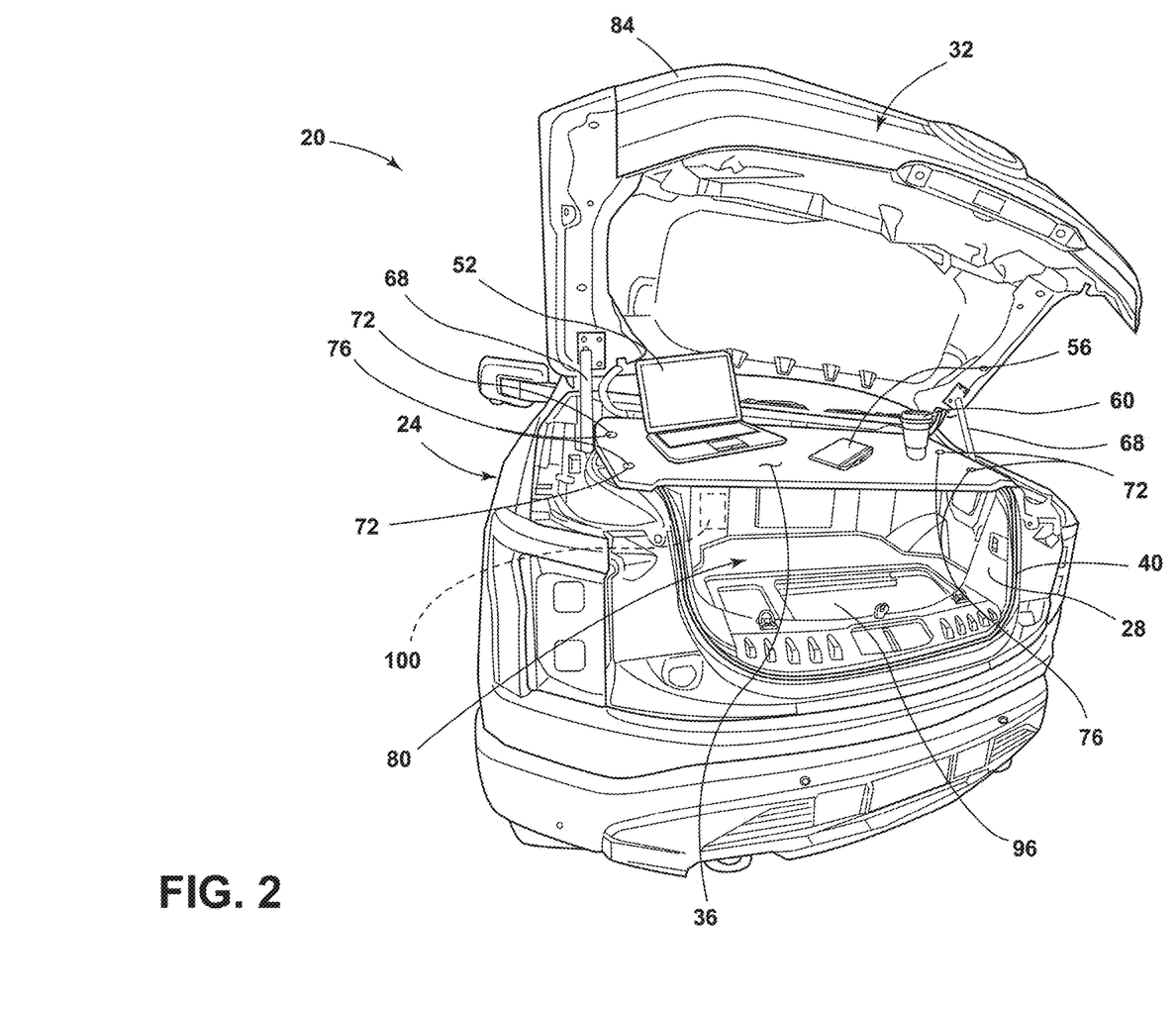
FIG. 2 is a front perspective view of the vehicle, illustrating the closure panel in the open position and the auxiliary panel in a disengaged state, according to one example.
Figure 3:
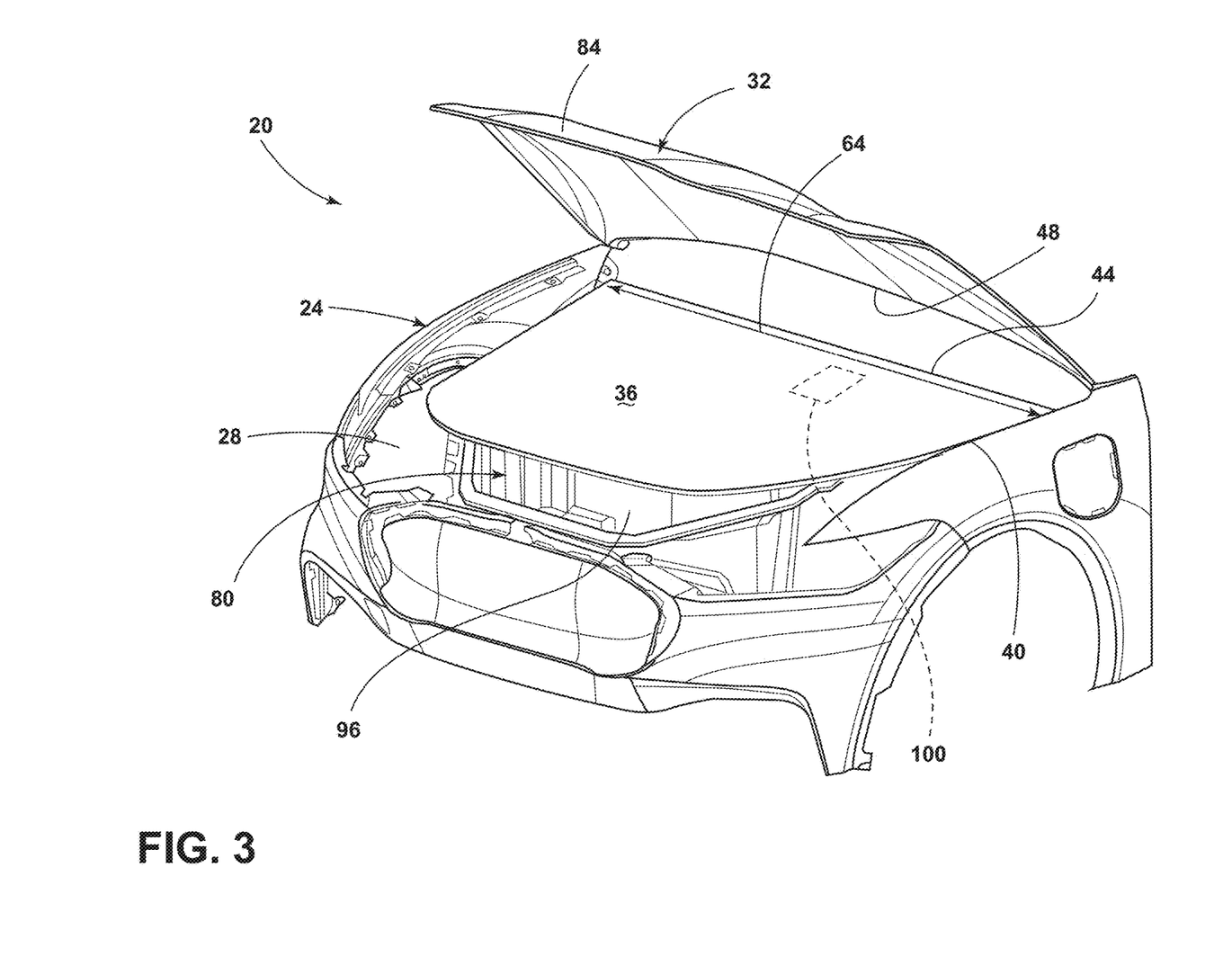
FIG. 3 is a front perspective view of the vehicle, illustrating the closure panel in the open position and the auxiliary panel in the disengaged state, according to one example.
Figure 4:
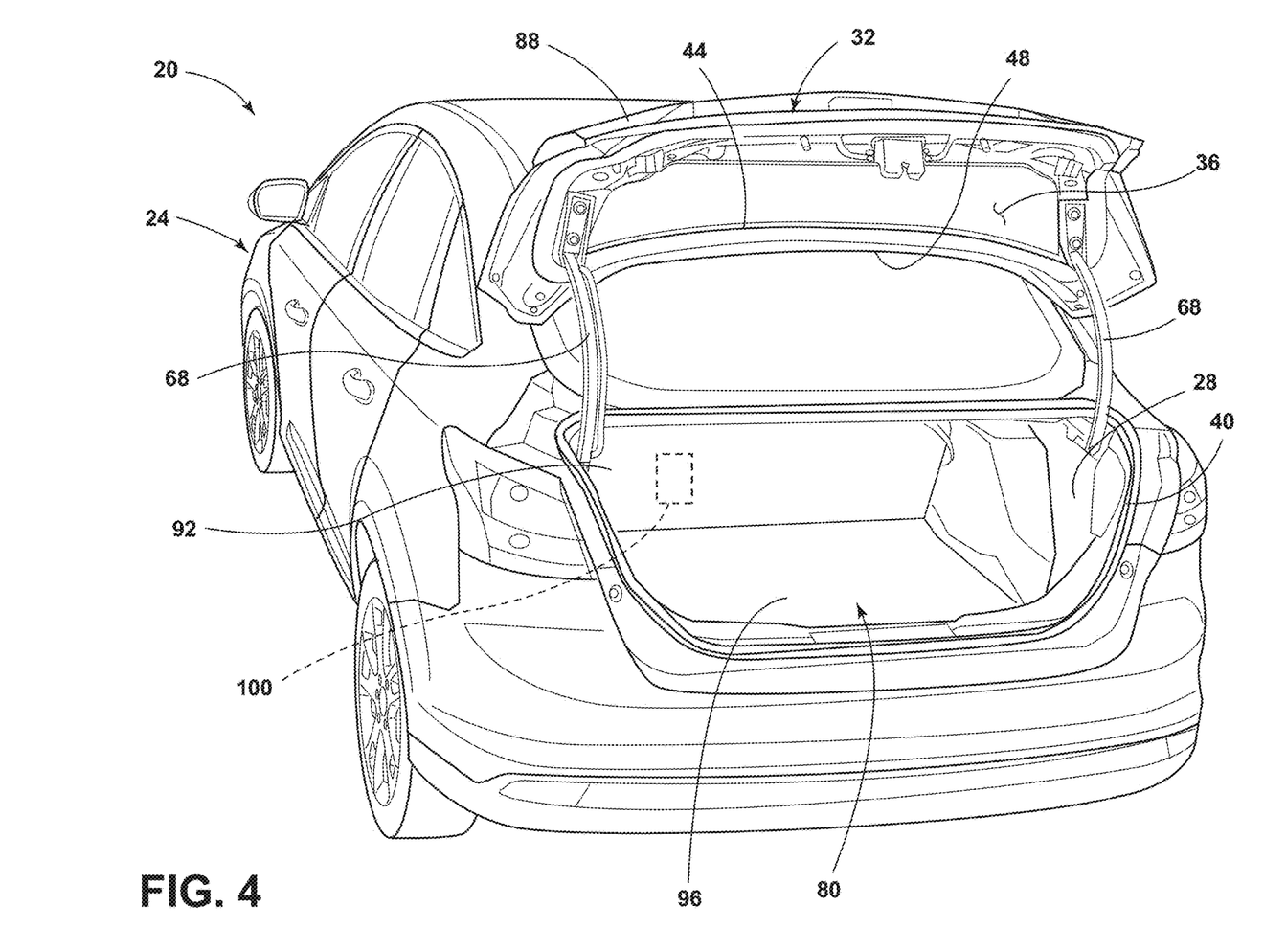
FIG. 4 is a rear perspective view of the vehicle, illustrating the closure panel in the open position and the auxiliary panel in the engaged state, according to one example.
Figure 5:
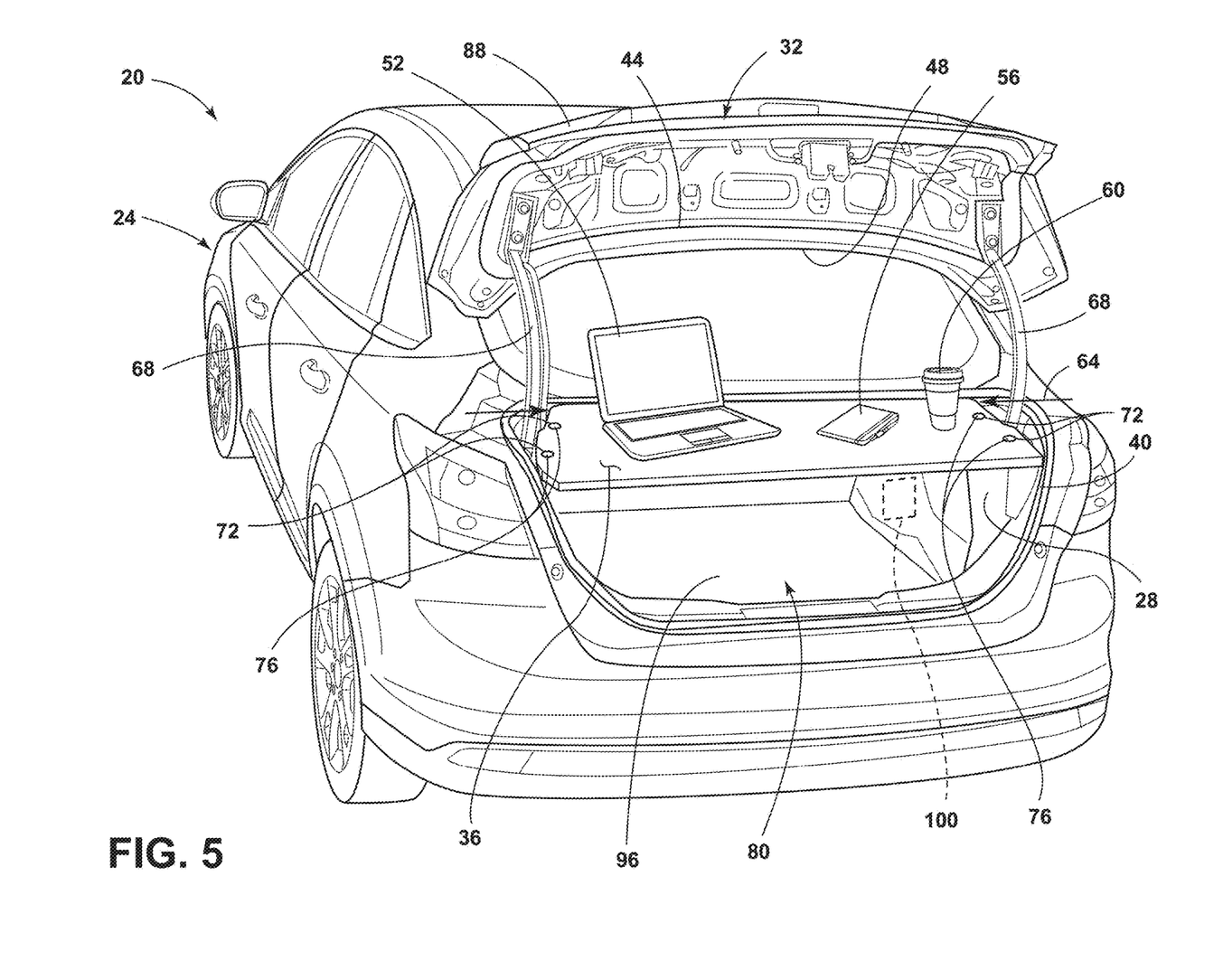
FIG. 5 is a rear perspective view of the vehicle, illustrating the closure panel in the open position and the auxiliary panel in the disengaged state, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-5, reference numeral 20 generally designates a vehicle. The vehicle 20 includes a body 24, an access aperture 28 that is defined by the body 24, a closure panel 32, and an auxiliary panel 36. The closure panel 32 is movably coupled to the body 24. The closure panel 32 is movable between an open position and a closed position such that the closure panel 32 selectively covers the access aperture 28. The auxiliary panel 36 can be removably coupled to the closure panel 32. The auxiliary panel 36 is movable between an engaged state (see FIGS. 1 and 4) and a disengaged state (see FIGS. 2, 3, and 5) relative to the closure panel 32. The auxiliary panel 36 travels with the closure panel 32 when the auxiliary panel 36 is in the engaged state. The disengaged state of the auxiliary panel 36 can correspond with a use position of the auxiliary panel 36.

Referring again to FIGS. 1-5, the vehicle 20 may be a motor vehicle. For example, the vehicle 20 may be a land-based vehicle (e.g., an automobile, a motorcycle, a train, etc.), an air-based vehicle (e.g., an airplane, a helicopter, etc.), and/or a water-based vehicle (e.g., a boat or other watercraft). While the vehicle 20 may be a motor vehicle, the present disclosure is not limited to internal combustion engines as a source of locomotive power for the vehicle 20.

Rather, alternative sources may be utilized in providing locomotive power to the vehicle 20. For example, locomotive power may be provided to the vehicle 20 by electric motors, fuel cells, and/or petroleum-based fuel engines. According to various examples, the vehicle 20 may be driver-controlled, semi-autonomous, fully-autonomous, or any combination of user-controlled and automated. For example, the semi-autonomous example of the vehicle 20 may perform many, or all, commuting independent of user interaction while the user maintains override control of the vehicle 20.

Referring further to FIGS. 1-5, the auxiliary panel 36 may be free of direct coupling with the closure panel 32 when the auxiliary panel 36 is in the disengaged state. For example, when the closure panel 32 is in the closed position, the auxiliary panel 36 may be placed in the disengaged state such that the auxiliary panel 36 is supported by a portion of a perimeter 40 of the access aperture 28 and/or supported by a portion of the body 24 that is immediately adjacent to the perimeter 40 of the access aperture 28. In some examples, the auxiliary panel 36 may be free of coupling with the vehicle 20 when the auxiliary panel 36 is in the disengaged state. In such an example, the auxiliary panel 36 may rest on the portion of the perimeter 40 of the access aperture 28 and/or supported by the portion of the body 24 that is immediately adjacent to the perimeter 40 of the access aperture 28 without the auxiliary panel 36 being fastened to the vehicle 20. Accordingly, such an arrangement of the disengaged state may be referred to as a passive coupling or passive engagement between the auxiliary panel 36 and the vehicle 20. In alternative examples, the auxiliary panel 36 may be hingedly coupled to the body 24 and/or the closure panel 32 such that the auxiliary panel 36 remains actively coupled to the vehicle 20 regardless of whether the auxiliary panel 36 is in the engaged state or the disengaged state. For example, a proximal end 44 of the auxiliary panel 36 may be hingedly coupled to a proximal end 48 of the closure panel 32.

Referring still further to FIGS. 1-5, the auxiliary panel 36 may be planar or substantially planar. In such an example, the auxiliary panel 36 may be utilized as a work surface. For example, when the auxiliary panel 36 is in the disengaged state and the closure panel 32 is in the open position, the auxiliary panel 36 may be used to support a computer 52, a notebook 56, a beverage container 60, and so on. Accordingly, the auxiliary panel 36 may be used as a support surface for a mobile workstation. In various examples, the auxiliary panel 36 may be sized and/or dimensioned such that a width 64 of the auxiliary panel 36 at the proximal end 44 generally corresponds with a distance between support members 68 of the closure panel 32. The auxiliary panel 36 can be coupled to the closure panel 32 by any suitable coupling arrangement. For example, the auxiliary panel 36 may be retained to the closure panel 32 when in the engaged state by way of one or more electromagnets, one or more fasteners, one or more solenoids, and/or combinations thereof. In one specific example, the auxiliary panel 36 may define one or more apertures 72 therein. In such an example, each of the aperture(s) 72 can receive a moveable fastener or a portion of a solenoid (e.g., a post of the solenoid) such that the auxiliary panel 36 is retained to the closure panel 32 when in the engaged state. For example, the moveable fastener may rotate by about ninety-degrees (90°) relative to the aperture 72 to transition the auxiliary panel 36 between the engaged state and the disengaged state. In such an example, the aperture 72 and the moveable fastener may each be oblong in shape with a major axis of the aperture 72 corresponding to the disengaged state and a minor axis of the aperture 72 corresponding to the engaged state. In an alternate example, each of the apertures 72 may receive a magnetically-susceptible insert 76 (e.g., metallic inserts, magnetically-susceptible polymers, etc.). In such an example, the closure panel 32 can be provided with an electromagnet that corresponds to each magnetically-susceptible insert 76 to enable transitioning between the engaged state and the disengaged state. For example, when the closure panel 32 is in the closed position and the electromagnet is energized, the auxiliary panel 36 may be transitioned from the disengaged state to the engaged state. Similarly, when the closure panel 32 is in the closed position and the electromagnet is de-energized, the auxiliary panel 36 may be transitioned from the engaged state to the disengaged state.

Referring yet again to FIGS. 1-5, the access aperture 28 can permit access to a cargo area 80. The cargo area 80 may be a rear trunk, a storage compartment, and/or a front trunk. In examples where the cargo area 80 is a front trunk, the closure panel 32 may be a hood 84 of the vehicle 20 (see FIGS. 1-3). In examples where the cargo area 80 is a rear trunk, the closure panel 32 may be a trunk lid 88 of the vehicle 20 (see FIGS. 4 and 5). In various examples, at least a portion of the cargo area 80 may remain accessible when the auxiliary panel 36 is in the disengaged state and the closure panel 32 is in the open position. For example, when the auxiliary panel 36 is in the disengaged state and the closure panel 32 is in the open position, the auxiliary panel 36 may extend over an upper region 92 of the cargo area 80 while a distal region 96 of the cargo area 80 remains open, available, or otherwise unimpeded. The terms "proximal" and "distal" as used herein are intended to be relational terms that convey relative proximity to a center of the vehicle 20.

Figure 6:
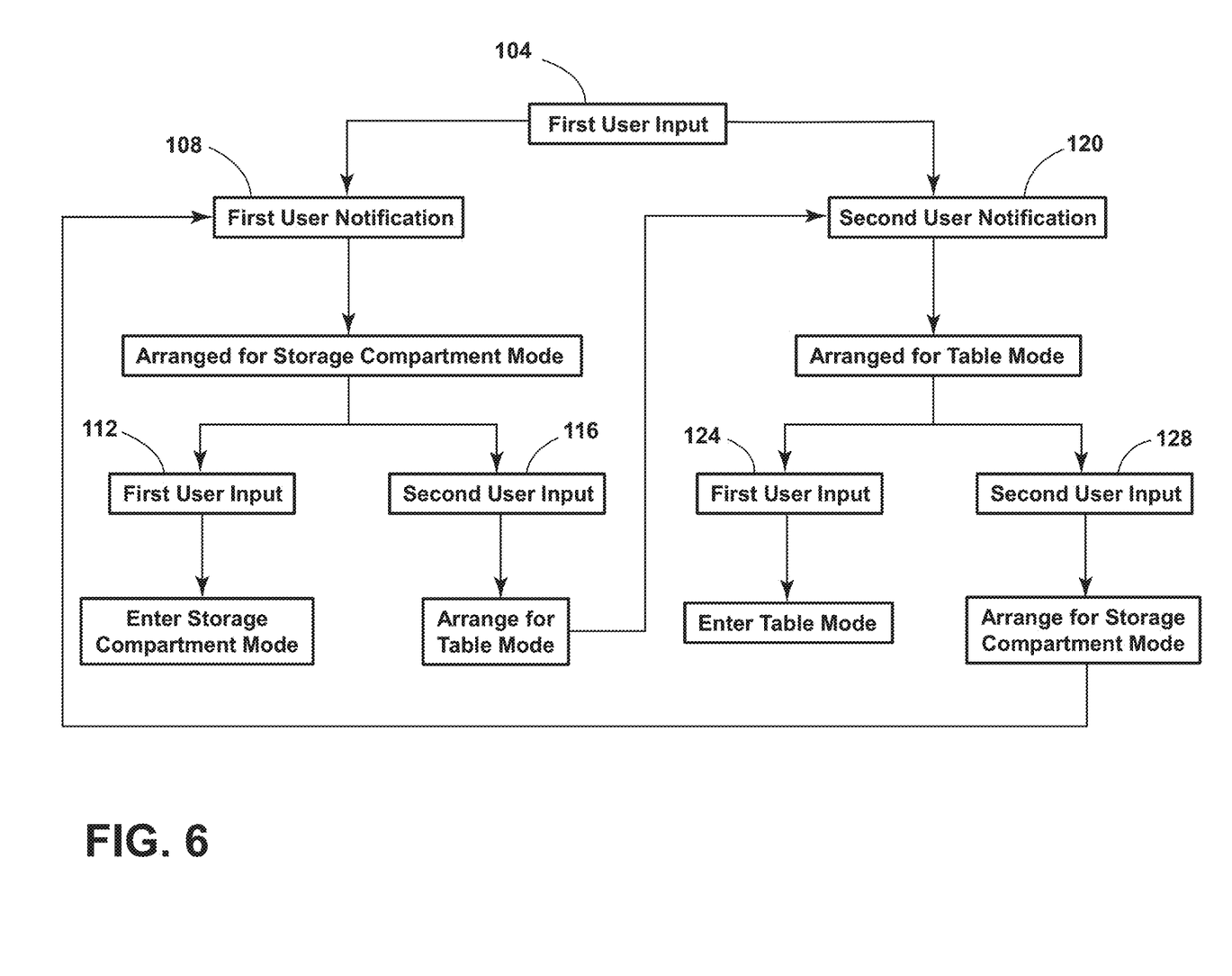
FIG. 6 is a flow diagram illustrating a method of entering different arrangement modes of the vehicle, according to one example.

Referring now to FIG. 6, the vehicle 20 includes a controller 100 (see FIGS. 1-5). When a user provides a first user input 104, the controller 100 may issue one of two notifications (e.g., a single honk of a horn or a double honk of a horn). For example, the first user input 104 may be, but is not limited to, pressing once on a button of a key fob for the vehicle 20. The specific notification issued can indicate to the user whether the vehicle 20 is arranged for a storage compartment mode where the auxiliary panel 36 is in the engaged state or the vehicle 20 is arranged for a table mode where the auxiliary panel 36 is in the disengaged state. For example, the controller 100 may issue a first user notification 108 in response to a first instance of the first user input 104 when the auxiliary panel 36 is in the engaged state. In such an example, if the user executes a second instance of the first user input 112, then the controller 100 can initiate placing the closure panel 32 in the open position. In some examples, the second instance of the first user input 112 may be required to be executed within a predetermined timeframe from issuance of the first user notification 108 to initiate placing the closure panel 32 in the open position. In various examples, the predetermined timeframe can be less than about thirty seconds, less than about twenty seconds, less than about ten seconds, and/or combinations or ranges thereof. It is contemplated, that the user may be provided with the option to override the requirement for the second instance of the first user input 112 to be within the predetermined timeframe of issuance of the first user notification 108. In such an example, the controller 100 may immediately enter the particular mode that the vehicle 20 is currently arranged in (e.g., the storage compartment mode or the table mode) when the first user input 104 is initially received.

Referring again to FIG. 6, the controller 100 can transition the auxiliary panel 36 to the disengaged state in response to a first instance of a second user input 116 that follows the first user notification 108 within a predetermined timeframe. In various examples, the predetermined timeframe can be less than about thirty seconds, less than about twenty seconds, less than about ten seconds, and/or combinations or ranges thereof. In such an example, the controller 100 can issue a second user notification 120 when the first instance of the second user input 116 is received within the predetermined timeframe. The second user notification 120, in such an example, may serve as an acknowledgment or confirmation of transitioning the auxiliary panel 36 from the engaged state to the disengage position. In some examples, the second user notification 120 may be issued once the transitioning of the auxiliary panel 36 from the engaged state to the disengaged state has been completed. Once the auxiliary panel 36 has been transitioned to the disengaged state, a third instance of the first user input 124 can transition the closure panel 32 from the closed position to the open position such that the vehicle 20 enters the table mode. In various examples, the third instance of the first user input 124 may be required to be executed within a predetermined timeframe from issuance of the second user notification 120 to initiate placing the closure panel 32 in the open position. If the user were to execute a second instance of the second user input 128 following issuance of the second user notification 120, then the controller 100 may initiate transitioning the auxiliary panel 36 from the disengaged state back to the engaged state, thereby returning to the storage compartment mode.

Figure 7:
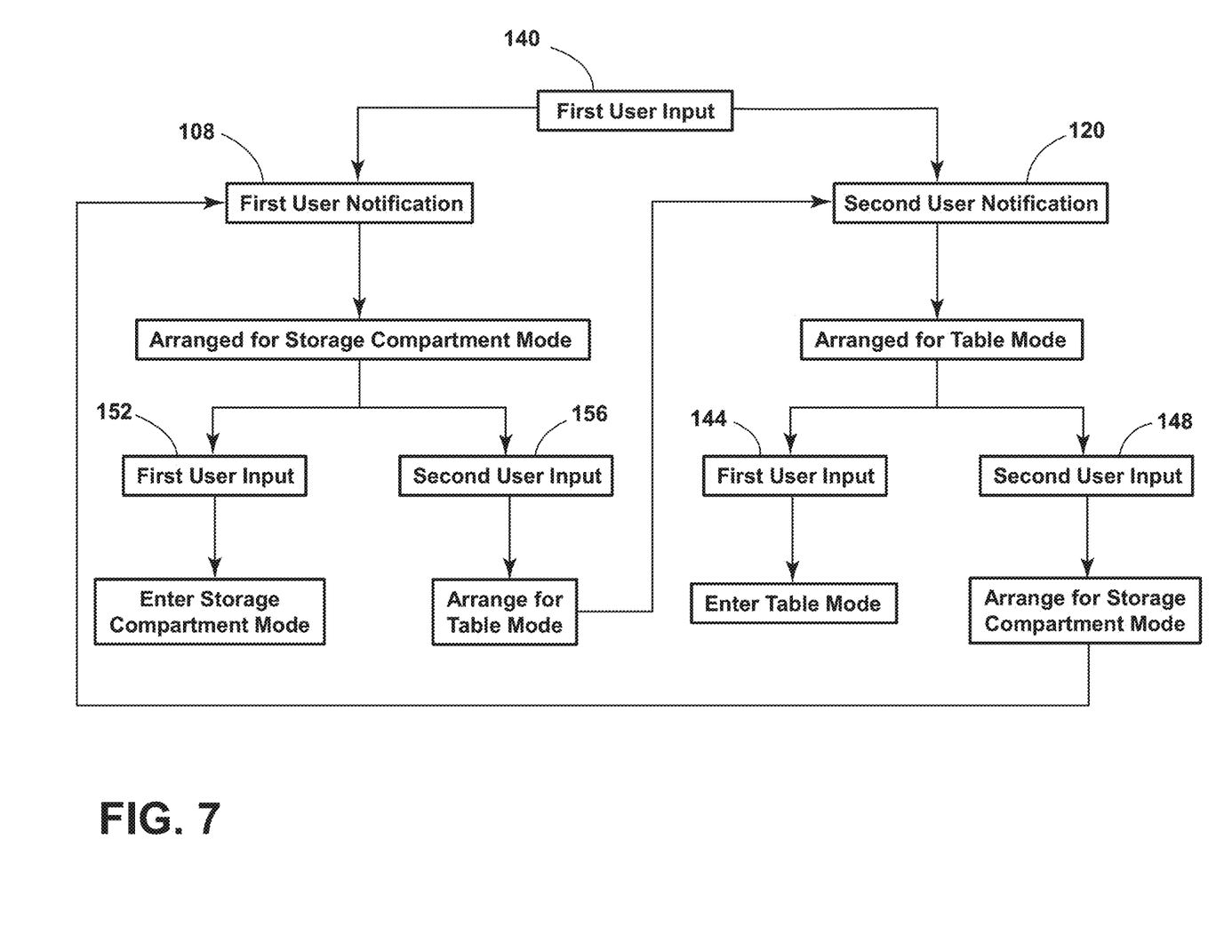
FIG. 7 is a flow diagram illustrating a method of entering different arrangement modes of the vehicle, according to one example.

Referring now to FIG. 7, when the auxiliary panel 36 is in the disengaged state and a first instance of a first user input 140 is received by the controller 100, the controller 100 can issue the second user notification 120. If the controller 100 receives a first instance of the first user input 140, then the controller 100 can initiate placing the closure panel 32 in the open position. In some examples, the second instance of the first user input 144 may be required to be executed within a predetermined timeframe from issuance of the second user notification 120 to initiate placing the closure panel 32 in the open position. In various examples, the predetermined timeframe can be less than about thirty seconds, less than about twenty seconds, less than about ten seconds, and/or combinations or ranges thereof. Once the closure panel 32 has been placed in the open position, the vehicle 20 has entered the table mode.

Referring again to FIG. 7, if a first instance of a second user input 148 is received following the first instance of the first user input 140 and issuance of the second user notification 120, then the controller 100 may initiate transitioning the auxiliary panel 36 to the engaged state. In some examples, the first instance of the second user input 148 may be required to be executed within a predetermined timeframe from issuance of the second user notification 120 to initiate placing the auxiliary panel 36 in the engaged state. In various examples, the predetermined timeframe can be less than about thirty seconds, less than about twenty seconds, less than about ten seconds, and/or combinations or ranges thereof. The controller 100 may issue the first user notification 108 when the first instance of the second user input 148 is received within the predetermined timeframe. Such issuance of the first user notification 108 can indicate to the user that the auxiliary panel 36 has been transitioned to, or placed in, the engaged state. After issuance of the first user notification 108, if the user executes a third instance of the first user input 152, the vehicle 20 may enter the storage compartment mode. In some examples, the third instance of the first user input 152 may be required to be executed within a predetermined timeframe from issuance of the first user notification 108 to initiate placing the closure panel 32 in the open position. In various examples, the predetermined timeframe can be less than about thirty seconds, less than about twenty seconds, less than about ten seconds, and/or combinations or ranges thereof.

Referring further to FIG. 7, if the controller 100 receives a second instance of the second user input 156 after issuance of the first user notification, the controller 100 may initiate arranging the vehicle 20 into the table mode. In some examples, the second instance of the second user input 156 may be required to be executed within a predetermined timeframe from issuance of the first user notification 108 to initiate placing the auxiliary panel 36 in the disengaged state. In various examples, the predetermined timeframe can be less than about thirty seconds, less than about twenty seconds, less than about ten seconds, and/or combinations or ranges thereof.

Referring to FIGS. 6 and 7 in one specific, non-limiting, example, the first user notification 108 may be a single honk of a horn of the vehicle 20 and the second user notification 120 may be a double honk of the horn of the vehicle 20. The single honk of the horn can be tied to the storage compartment mode and the double honk of the horn can be tied to the table mode such that a user can be confident in the meaning of such notification. The functionality of the first user input, regardless of the instance of the input (e.g., first, second, third, etc.), can take the user along a path of entering into the mode that the vehicle 20 is currently arranged in (e.g., storage compartment mode or table mode). For example, where the first user input is a single actuation of a button on a key fob for the vehicle 20, by actuating the button once for a first time, the vehicle 20 can communicate to the user the current mode arrangement, after such communication, the user can actuate the button once for a second time to enter into the current mode arrangement. The second user input can serve as a way for the user to exit the current mode arrangement and initiate entering into another mode arrangement. For example, where the second user input is a double actuation of the button of the key fob for the vehicle 20 (e.g., two actuations in rapid succession), such actuation following communication of the current mode arrangement (e.g., the first user notification 108 or the second user notification 120) can transition the vehicle 20 from the storage compartment mode to the table mode. It is contemplated that execution of the second user input (e.g., double actuation of the button on the key fob) may initiate transition the vehicle 20 out of the current mode arrangement and into another mode arrangement. Accordingly, a user that knows the current mode arrangement is not the one they desire may more rapidly enter into their desired mode arrangement. In some examples, the controller 100 may ensure that the auxiliary panel 36 to the engaged state when a transmission of the vehicle 20 is shifted out of a parked state. Accordingly, the auxiliary panel 36 may be prevented from additional movement and/or noise while the vehicle 20 is traveling.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle, comprising:
   a body;
   an access aperture defined by the body;
   a closure panel that is movably coupled to the body, wherein the closure panel is movable between an open position and a closed position such that the closure panel selectively covers the access aperture;
   an auxiliary panel that is removably coupled to the closure panel, wherein the auxiliary panel is movable between an engaged state and a disengaged state relative to the closure panel, wherein the auxiliary panel travels with the closure panel when the auxiliary panel is in the engaged state, and wherein the disengaged state of the auxiliary panel corresponds with a use position of the auxiliary panel, and
   a controller that issues a first user notification in response to a first instance of a first user input when the auxiliary panel is in the engaged state.

2. The vehicle of claim 1, wherein the auxiliary panel is free of direct coupling with the closure panel when the auxiliary panel is in the disengaged state.

3. The vehicle of claim 1, wherein the auxiliary panel is a work surface.

4. The vehicle of claim 1, wherein the closure panel is a hood of the vehicle.

5. The vehicle of claim 1, wherein the access aperture permits access to a cargo area.

6. The vehicle of claim 5, wherein at least a portion of the cargo area remains accessible when the auxiliary panel is in the disengaged state and the closure panel is in the open position.

7. The vehicle of claim 1, wherein the controller places the closure panel in the open position in response to a second instance of the first user input.

8. The vehicle of claim 1, wherein the controller transitions the auxiliary panel to the disengaged state in response to a first instance of a second user input that follows the first user notification within a predetermined timeframe.

9. The vehicle of claim 8, wherein the controller issues a second user notification when the first instance of the second user input is received within the predetermined timeframe.

10. The vehicle of claim 9, wherein the second user notification indicates that the auxiliary panel has been transitioned to the disengaged state.

11. The vehicle of claim 1, wherein the controller issues a second user notification in response to the first instance of the first user input when the auxiliary panel is in the disengaged state.

12. The vehicle of claim 11, wherein the controller places the closure panel in the open position in response to a second instance of the first user input.

13. The vehicle of claim 12, wherein the controller transitions the auxiliary panel to the engaged state in response to a first instance of a second user input that follows the first user notification within a predetermined timeframe.

14. The vehicle of claim 13, wherein the controller issues the first user notification when the first instance of the second user input is received within the predetermined timeframe.

15. The vehicle of claim 14, wherein the first user notification indicates that the auxiliary panel has been transitioned to the engaged state.

16. A vehicle, comprising:
   a body;
   an access aperture defined by the body, wherein the access aperture permits access to a cargo area;
   a closure panel that is movably coupled to the body, wherein the closure panel is movable between an open position and a closed position such that the closure panel selectively covers the access aperture;

an auxiliary panel that is removably coupled to the closure panel, wherein the auxiliary panel is a work surface, wherein the auxiliary panel is movable between an engaged state and a disengaged state relative to the closure panel, wherein the auxiliary panel travels with the closure panel when the auxiliary panel is in the engaged state, wherein the disengaged state of the auxiliary panel corresponds with a use position of the auxiliary panel, wherein the auxiliary panel is free of direct coupling with the closure panel when the auxiliary panel is in the disengaged state, and wherein at least a portion of the cargo area remains accessible when the auxiliary panel is in the disengaged state and the closure panel is in the open position;

a controller that issues a first user notification in response to a first instance of a first user input when the auxiliary panel is in the engaged state, wherein the controller places the closure panel in the open position in response to a second instance of the first user input when the auxiliary panel is in the engaged state, wherein the controller transitions the auxiliary panel to the disengaged state in response to a first instance of a second user input that follows the first user notification within a predetermined timeframe when the auxiliary panel is in the engaged state, wherein the controller issues a second user notification when the first instance of the second user input is received within the predetermined timeframe.

17. The vehicle of claim 16, wherein the closure panel is a hood of the vehicle.

18. The vehicle of claim 16, wherein the controller issues a second user notification in response to the first instance of the first user input when the auxiliary panel is in the disengaged state, wherein the controller places the closure panel in the open position in response to a second instance of the first user input when the auxiliary panel is in the disengaged state, wherein the controller transitions the auxiliary panel to the engaged state in response to a first instance of a second user input that follows the first user notification within a predetermined timeframe when the auxiliary panel is in the disengaged state, wherein the controller issues the first user notification when the first instance of the second user input is received within the predetermined timeframe, wherein the first user notification indicates that the auxiliary panel has been transitioned to the engaged state.

* * * * *